United States Patent Office 3,287,643
Patented Nov. 22, 1966

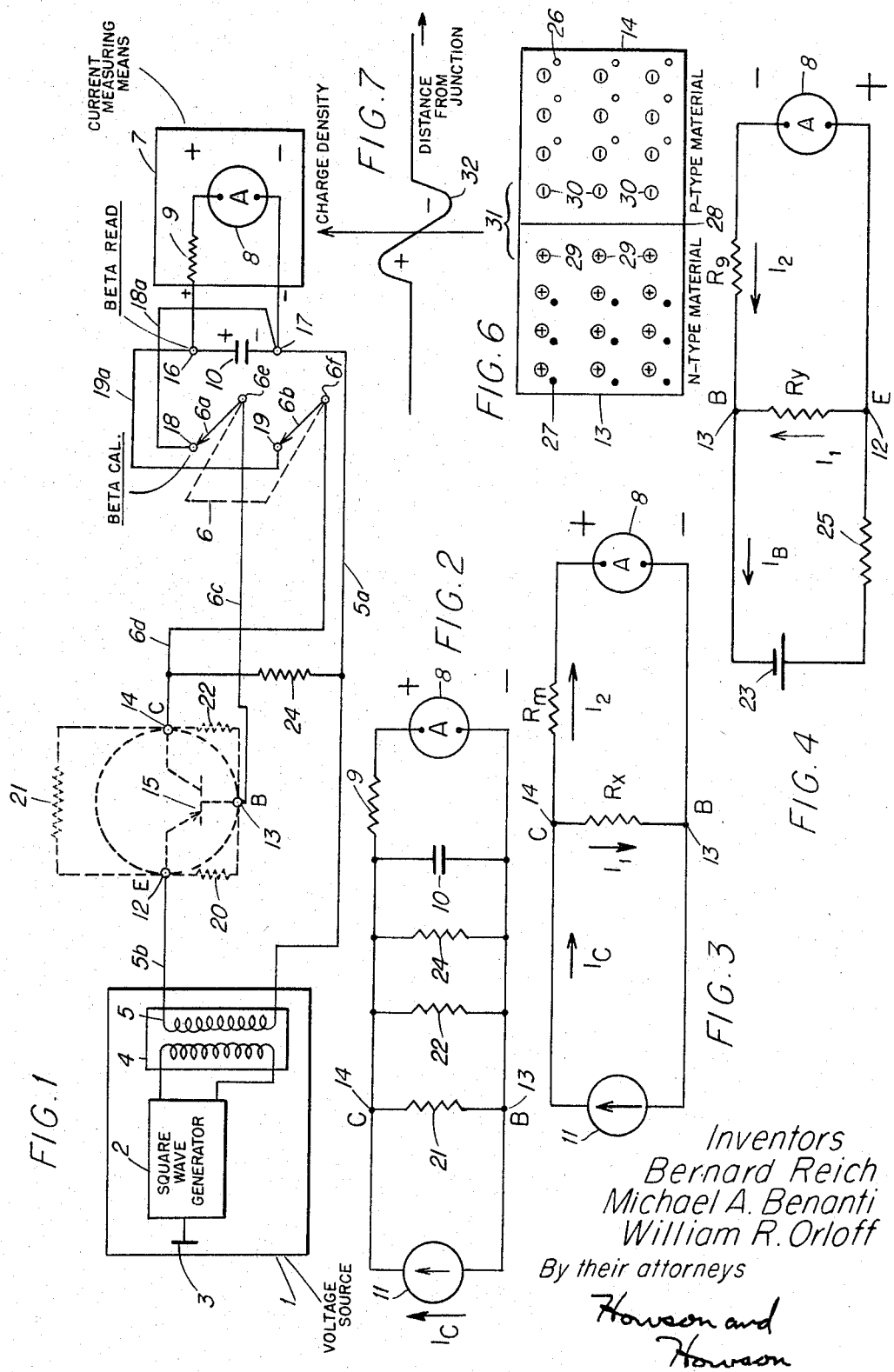

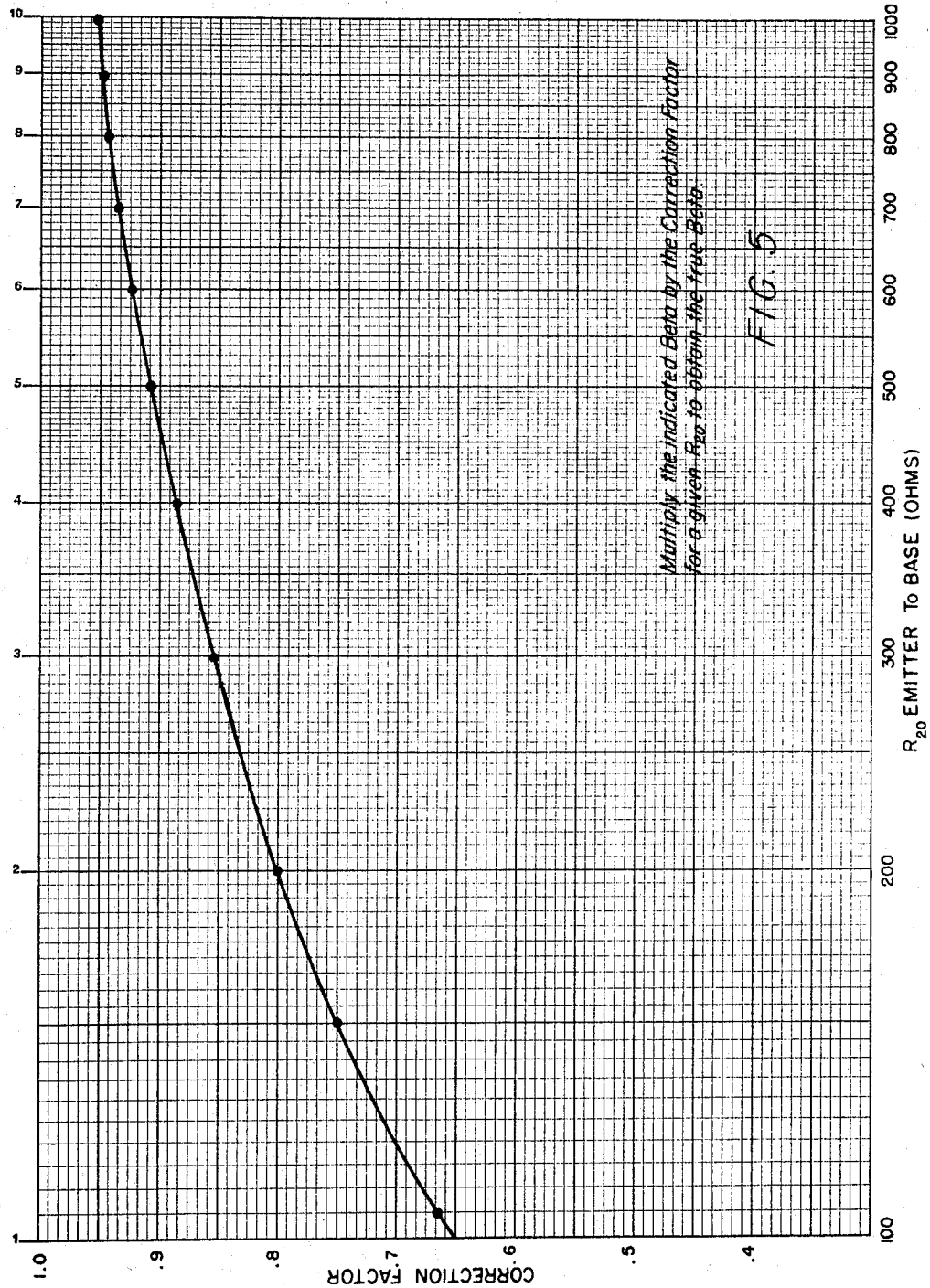

3,287,643
METHOD AND APPARATUS FOR MEASURING THE BETA PARAMETER OF AN IN-CIRCUIT TRANSISTOR WITHOUT THE APPLICATION OF D.C. BIASING THERETO
Bernard Reich, Wanamassa, N.J., Michael A. Benanti, Brooklyn, N.Y., and William R. Orloff, Inglewood, Lansdale, Pa., assignors, by mesne assignments, to American Electronic Laboratories, Inc., Colmar, Pa., a corporation of Pennsylvania
Filed Apr. 8, 1963, Ser. No. 271,366
12 Claims. (Cl. 324—158)

This invention relates to a transistor test set and a method for measuring the beta parameter of a transistor. More particularly, it relates to a method and apparatus for measuring the beta parameter of a transistor connected in a circuit with other components.

This is a continuation-in-part of our copending application, Serial No. 131,856 filed August 16, 1961, now abandoned.

A transistor is a semiconductor device which typically has three parts, namely an emitter, base and collector. Each of these has an electrode. The beta parameter, which this invention measures, is defined as the ratio of the current through the collector electrode divided by the current through the base electrode while the collector voltage is kept constant. The beta parameter is useful because it gives considerable information about the operating characteristics of the device, and enables the engineer to determine whether any given transistor is satisfactory for the particular circuit in which he wishes to use it.

Though beta measurement of transistors may ordinarily be accomplished with good accuracy by measuring the ratio of the collector current to the base current with the collector voltage fixed, the measurement may be inaccurate if it is made when the transistor is connected in a circuit with other components. Transistors are often connected, for example, in amplifier circuits which include various circuit components having substantial resistance, and these components affect the measurement of beta. They provide paths through which current may flow bypassing both the transistor and the means by which the current is measured. Currents flowing in such paths give rise to erroneous readings of current causing inaccurate beta measurement.

Prior art methods and apparatus have attempted to avoid in-circuit measurement errors but they have had several drawbacks. The apparatus they employ is relatively complicated and incapable of accurate beta measurement when the transistor is connected with a low impedance loading as is the case in many common circuits. Furthermore, such methods and apparatus use a transistor biasing source which, if connected to the transistor with improper polarity, may damage it. Such a biasing source may also damage certain electrolytic and tantalum capacitors which are sometimes connected to the transistor.

It is, therefore, one object of this invention to provide a direct reading method and apparatus for in-circuit measurement of the beta of a transistor which method and apparatus are less complex than those of the prior art.

It is another object of this invention to provide a more accurate method and apparatus for in-circuit measurement of the beta of a transistor with a low impedance loading.

It is still another object of this invention to provide a method and apparatus for in-circuit measurement of the beta of a transistor which eliminates the possibility of damaging or destroying transistors and components connected with them.

It is a further object of this invention to provide a method and apparatus for in-circuit measurement of the beta of a transistor in a common base configuration having an A.C. input by using D.C. current measurements.

Various other objects of the invention will appear from the following description of the invention, the novel features of which will be particularly pointed out hereinafter and in the appended claims.

To understand the method and apparatus according to the invention and how their objectives are accomplished it is necessary to understand how a transistor operates. A PNP or NPN transistor, operated, for example, as an amplifier, has two input terminals and two output terminals. One of its three electrodes is common to both its input circuit and its output circuit and serves as an input and an output terminal. In a common base configuration the base electrode is common to both the input and output circuits. A common base configured transistor may be operated in several different ways. When it is being tested, according to the invention it is operated with a reverse bias on the collector electrode and an alternating voltage bias with alternating positive and negative voltages on the emitter electrode. This way of operating a transistor is called class B operation.

In class B operation of a common base configured PNP transistor the collector is always reverse biased with a negative D.C. voltage, usually applied from an external source, and the emitter is biased with an alternating voltage which is positive part of the time and negative part of the time. Current will flow through the transistor emerging from the collector when the positive part of the alternating voltage is on the emitter. When the emitter is negatively biased no current will flow at all. Thus a class B operated PNP transistor operates as a rectifier which conducts part of the time and blocks current flow part of the time.

In testing a transistor according to the invention the transistor is operated in a common base configuration as a class B amplifier. However, the reverse bias on the collector, needed for class B operation, is obtained without applying an external source, by keeping the amplitude level of the collector current below the level of the collector saturation current. The necessary bias is created by the transistor itself when operated in this manner. Using this bias and applying an appropriate alternating voltage to the emitter-base input terminals, D.C. current is made to flow in the collector and base. These currents are measured, and beta is determined.

FIG. 1 is a diagram partially in block form of a preferred embodiment of the invention for measuring the beta of a PNP transistor.

FIG. 2 is a simplified circuit diagram showing the interconnection of circuit elements in FIG. 1 through which the collector current might flow.

FIG. 3 is a simplified circuit diagram showing the error effect of circuit elements in FIG. 2 in the D.C. collector current reading through the ammeter.

FIG. 4 is a simplified circuit diagram showing the error effect of circuit elements in the D.C. base current reading through the ammeter.

FIG. 5 is a chart showing a correction factor curve for beta where a transistor has loadings from 1000 ohms to 100 ohms.

FIG. 6 is a schematic diagram showing a P-N junction.

FIG. 7 is a schematic diagram showing the charge density near the junction of FIG. 6.

Referring to FIG. 1, the transistor to be tested, 15, is shown connected in a circuit with components 20, 21 and 22, all of which have substantial resistance. The transistor 15 and its associated circuit components are shown in dotted lines to distinguish them from the circuitry which is part of the testing device. For purposes of illustration the circuits shown, use a PNP transistor, though with appropriate polarity changes they could equally well be used with a NPN transistor.

Transistor 15 has emitter, base and collector electrodes indicated as 12, 13 and 14, respectively. Resistive component 20 is connected to emitter 12 and base 13. Resistive component 21 is connected to emitter 12 and collector 14, and resistive component 22 is connected to base 13 and collector 14.

The values of the resistive components 20–22 are generally dictated by the requirements of the circuit in which the transistor is connected. Typically, component 20 has a resistive value of 500 ohms or more, but it could be less than 500 ohms. Components 21 and 22 both have typical resistive values of more than 500 ohms.

The device according to the invention comprises an alternating voltage source 1. The source 1 preferably comprises a square wave generator 2, having a control 3 for varying the output amplitude of the square wave. Connected to generator 2 is a transformer 4 having a secondary winding 5 with negligible D.C. resistance when compared to the resistances of components 20–22. Winding 5 preferably has a resistance on the order of say *less than* 1 ohm. The winding 5 of voltage source 1 is adapted to be connected to emitter 12 by line 5b and to base 13, by circuitry which will be described more fully below. In practical terms, the connections to the transistor electrodes may be made by miniature alligator clips or printed circuit type probes. Transformer 4 serves to couple the signal from generator 2 to the transistor 15.

The measuring device further comprises switch 6, having an upper terminal 6e which is adapted for connection to base electrode 13, and a lower terminal 6f which is adapted for connection to collector electrode 14. Switch 6 has two movable contact arms, namely arm 6a which is connected to terminal 6e, and arm 6b which is connected to terminal 6f. Arm 6a is connected to transistor base 13 via line 6c. Arm 6b is connected to transistor collector 14 via line 6d. Arm 6a can be closed by engagement with either of two terminals 16 and 18. Similarly, arm 6b can be closed by engagement with either of terminals 17 and 19. Arms 6a and 6b move together so that when arm 6a engages terminal 18 arm 6b engages terminal 19, and when arm 6a engages terminal 16 arm 6b engages terminal 17.

The device further comprises a current measuring means generally indicated as 7. This comprises preferably a direct current ammeter 8 having an internal coil resistance shown as resistor 9 in series with the ammeter 8. Current measuring means 7 has its positive side connected to terminal 16, and its negative side to terminal 17. A capacitor 10 is also connected to terminals 16 and 17 with the positive side of capacitor 10 connected to terminal 16. Terminal 19 associated with arm 6b of switch 6 is connected to terminal 16 by a line 19a, and terminal 17, also associated with arm 6b, is connected to terminal 18 by a line 18a. A line 5a from voltage source 1 is also connected to terminal 17. One final element completes the circuit of the measuring device as shown. A resistor 24 is connected across lines 6d–5a and thus to collector 14 and the negative side of current measuring means 7 and ammeter 8.

In a typical case, the ammeter 8 will have a 100 microamp. full scale deflection movement. Typically, its internal or coil resistance 9 is about 50 ohms or less at 100 microamps. Such meters are presently available on the market. The resistance 9 of the meter may be considered as small compared to the resistance of components 20–22. Resistor 24, when connected in parallel with the ammeter 8 serves to shunt the meter, giving it a broader range. By choosing appropriate values for resistor 24 any preferred full scale of deflection reading of say 500 microamps. or more may be obtained. The combined resistance of the meter and its shunt resistance would then be say 10 ohms at that current value (500 microamp.). Capacitor 10 is used as a bypass capacitor, to prevent alternating voltages from affecting the ammeter reading.

In accordance with the invention, the measurement of the beta of transistor 15 is accomplished by making two measurements. Switch 6 and winding 5 of source 1 are first connected to the transistor 15, by attaching lines 5b, 6c and 6d to transistor terminals 12, 13 and 14, respectively. Switch arm 6a is then engaged with terminal 18 and switch arm 6b with terminal 19, terminals 16 and 17 being open circuited. This is the "beta calibrate" position of switch 6.

Control 3 of source 1 is then adjusted to provide a full scale deflection reading on ammeter 8. With switch 6 in this position, resistor 24 is in parallel with ammeter 8 and its resistance 9 so the current through ammeter 8 and shunt resistor 24 is for example say, 500 microamps.

The setting for control 3 having been adjusted to give a full scale deflection ammeter reading, switch 6 is next operated so that its terminals 18 and 19 are open circuited and so that arm 6a engages terminal 16 and arm 6b engages terminal 17. This is the "beta read" position of switch 6. In this position a short circuit is connected across collector 14 and base 13 through which the current at the full scale deflection ammeter reading flows. With switch 6 in its "beta read" position ammeter 8 is connected to measure the current through base 13. Ammeter 8 preferably has a 100 microamp. full scale deflection in this position because resistor 24 is no longer across ammeter 8 but is shunted by the short circuit. Beta may now be read directly from the ammeter.

This is possible because with the collector current fixed at, say, 500 microamps. and a constant collector voltage the only variable remaining to determine beta is the base current. Thus, the meter, reading base current, may be calibrated directly in terms of beta.

Perhaps it should be noted at this point that the transistor may be connected in its own circuit to operate in a common base, a common emitter or common collector configuration depending on the requirements of the circuit. When the transistor is being measured for beta according to the invention however, it is operated in a common base configuration no matter what its in-circuit operating configuration may be.

As pointed out above, prior art testing methods and apparatus have supplied the collector reverse bias by a voltage source added to the circuit. It is one of the outstanding characteristics of the invention, however, that no externally applied collector bias source is necessary. According to the invention the reverse bias is supplied by the collector-base PN junction itself.

To explain this point more fully, reference is made to FIG. 6. Shown in this figure are the base 13 and collector 14 portions of an unbiased PNP transistor. Base 13 is connected to collector 14 at a junction 28. Since collector 14 is made of P-type material, its majority current carriers are holes shown at 26. Base 13 is made of N-type material, and electrons shown at 27 are its majority current carriers. The electrons 27 adjacent junction 28 in the N-type material will diffuse across the junction and combine with the holes 26 in the P-type material adjacent the junction. This combination leaves the charge distribution unbalanced adjacent the junction 28. Uncovered positive ions 29 in the base, and uncovered negative ions 30 in the collector are adjacent the junction 28. Ions 30 provide a small reverse potential or bias for collector 14. The region adjacent junction 28 which contains uncovered ions 29 and 30 is called the depletion region and is indicated at 31. The potential charge distribution across depletion region 31 is indicated qualitatively in FIG. 7. This figure shows a plot of charge density vs. distance from the junction 28, and a negative potential 32 on collector 14 caused by ions 30 is clearly visible.

A similar reverse bias in the opposite direction is created on an NPN transistor collector when no appreciable current flows.

When emitter 12 is forward biased and current begins to flow through the transistor, there is a voltage drop across the base and collector due to the base and collector ohmic terminal and body resistances. The sum of these resistances is called the saturation resistance of the transistor. The direction of current flow in a transistor operating class B causes this voltage drop to be of opposite polarity to the reverse bias potential. Thus, when the collector current reaches a certain level, this voltage drop becomes greater than the reverse bias potential and the collector becomes forward biased. The current at which this potential reversal occurs is called the collector-base saturation current. The amplitude of the saturation current for a given transistor depends on the value of its saturation resistance. By way of example, only, the saturation current for a typical transistor might have a value of 1 milliampere or more. When the potential reversal occurs, the transistor is driven into saturation and no longer operates class B.

According to the invention, by adjusting the emitter bias the collector current is kept smaller than the collector saturation current level. The collector, therefore, never becomes forward biased, and the need for an external collector biasing source is done away with.

To achieve beta a square wave input voltage signal is preferred. Such a signal gives a higher D.C. value of output current with a lower peak collector current than any other. Thus, there is less chance of driving the transistor into saturation than with a sine wave input which has higher current peaks.

Beta is measured more accurately by the method and apparatus according to the invention than in prior art devices, which have an accuracy of about ±20% at 500 ohms loading. What error there is in measuring beta according to the invention is due to current shunting transistor 15 and ammeter 8. These errors are never more than ±10% with 500 ohms loading as will be shown hereinafter.

On the input side of the transistor no currents bypass transistor 15 because the average current through a resistive component due to an A.C. square wave is zero. In addition, since the D.C. resistance of winding 5 is less than 1 ohm any D.C. current through resistive component 20 may be neglected.

In the output circuit the situation can be more easily seen by referring to FIG. 2. With switch 6 (FIG. 1) in the "beta calibrate" position, and neglecting the D.C. resistance of winding 5, it is seen that resistive components 21 and 22, resistor 24 and capacitor 10 are in parallel and ammeter 8 and its internal or coil resistance 9. Current generator 11 represents the current $I_c$ coming from collector 14. Bypass capacitor 10 may be neglected in this D.C. analysis.

FIG. 3 is obtained by considering $R_x$ as the parallel combination of resistive components 21 and 22 with $R_m$ considered as the internal resistance of ammeter 8 shunted by resistor 24 which may be chosen for example, to give ammeter 8 a 500 microamp. full scale deflection current reading. $R_x$ is shown connected between collector and base electrodes 14 and 13 respectively, as is ammeter 8 with its series resistance $R_m$.

Collector current $I_c$ flowing out of the collector divides into $I_1$ through $R_x$ and $I_2$ through $R_m$ and ammeter 8.

Clearly, $$I_c = I_1 + I_2 \rightarrow I_1 = I_c - I_2 \quad \text{(Eq. 1)}$$

and $$I_1 R_x = I_2 R_m \rightarrow (I_c - I_2) R_x = I_2 R_m \rightarrow$$
$$I_c R_x = I_2 (R_x + R_m) \quad \text{(Eq. 2)}$$

therefore $$I_c = I_2 \frac{(R_x + R_m)}{R_x} \quad \text{(Eq. 3)}$$

Thus, $I_c$ is greater than $I_2$ by a factor of $$\frac{R_x + R_m}{R_x}$$

With an $R_m$ of 10 ohms according to this invention and $R_x$ a typical load value of 500 ohms, $$\frac{R_x + R_m}{R_x} = 1.02$$

Thus, the collector current reading is low by 2%. This error tends to make beta 2% smaller than its true value.

When switch 6 is in its "beta read" position, resistor 24 is shorted out, and neglecting the resistance of winding 5 components 20 and 22 are in parallel with ammeter 8 and its internal resistance 9. The effect of component 21 may be neglected for its resistance is much greater than the resistance of winding 5. Capacitor 10 also may be neglected for steady state conditions. Since the emitter to base junction of transistor 15 rectifies the A.C. square wave and causes a current to flow in the emitter base circuit the emitter base junction may be considered as a D.C. voltage generator with a series resistance. Also, the two parallel shunting resistive components 20 and 22 may be considered as $R_y$ where $R_y$ is equal to $$\frac{R_{20} \times R_{22}}{R_{20} + R_{22}}$$

FIG. 4 shows the effect of these resistive components on beta. Treating the emitter-base junction as a voltage generator 23 with series resistance 25 we see that currents $I_1$ flowing into the base from the emitter through $R_y$, and $I_2$ flowing into the base from the emitter through ammeter 8 and $R_9$ make up $I_B$ the current flowing through the base.

Clearly, $$I_B = I_1 + I_2 \rightarrow I_1 = I_B - I_2 \quad \text{(Eq. 4)}$$

and $$I_1 R_y = I_2 R_9 \rightarrow (I_B - I_2) R_y = I_2 R_9 \quad \text{(Eq. 5)}$$

$$\rightarrow I_B = I_2 \frac{(R_y + R_9)}{R_y} \quad \text{(Eq. 6)}$$

Thus, the true base current is greater than $I_2$ by a factor of $$\frac{R_y + R_9}{R_y}$$

As stated previously, $R_9$ has a value of about 50 ohms, and if we assume a value of 500 ohms for $R_y$ then $$\frac{R_9 + R_y}{R_y} = 1.1$$

This means that $I_B$ is 10% larger than the current measured, which means beta is smaller than that indicated.

The small error in the "beta calibrate" measurement indicates too small a current value, and partially compensates for the too large a beta indication in the "beta read" measurement. In any case, in most circuits components 22 and 21 have much greater resistive values than component 20 so that $R_y \cong R_{20}$. Thus, it may be said that, for a fixed collector current, the beta reading in the base current measurement is a function of $R_9$ and $R_{20}$. More specifically, it is lower than the measured current by a factor of $$\frac{R_{20}}{R_9 + R_{20}}$$

Knowing the value of $R_{20}$ a chart such as is presented in FIG. 5, may be constructed which gives a correction factor for the beta reading. This chart indicates the proper correction factor for transistor $R_{20}$ loadings down to 100 ohms. The resulting beta is accurate within 10% down to that loading.

Though the invention has been described using a PNP transistor as an example, an NPN transistor could just as easily have been used. Both PNP and NPN transistors provide their own reverse collector electrode bias when not driven into saturation. Ammeter 8 need only have its connections reversed for the apparatus to measure beta for NPN transistors. As this change will be apparent to those skilled in the art, it is not shown in the drawings.

It will be understood that various changes in the details, materials, steps and arrangements of parts, which have been herein described and illustrated in order to explain the nature of the invention, may be made by those skilled in the art within the principle and scope of the invention.

What is claimed is:

1. The method of measuring the beta parameter of a transistor having base, emitter and collector electrodes connected in circuit with other electrical components, said method comprising the steps of:

connecting an impedance between collector and base electrodes, said impedance being small compared to the impedance of said other electrical components, applying a voltage signal from an alternating voltage source having a negligible D.C. impedance, compared to the impedances of said other electrical components, to the emitter and base electrodes, adjusting the amplitude of said signal to produce a rectified collector electrode current with a predetermined D.C. component, said rectified current having a peak value smaller than the collector-base saturation current for said transistor, and being provided in the absence to said transistor of a D.C. voltage component from a source external to the transistor applied for biasing purposes, and measuring the D.C. component of the base electrode current while maintaining said collector electrode current, whereby, knowing the amplitude of said D.C. component of collector electrode current, the beta parameter of said transistor depends on the magnitude of the D.C. component of said base electrode current and may be indicated directly by the last said measurement.

2. The method of measuring the beta parameter of a transistor according to claim 1, wherein a square wave voltage signal, from said source is applied to the emitter and base electrodes of said transistor.

3. The method of measuring the beta parameter of a transistor according to claim 1, wherein a short circuit is connected between the collector and base electrodes of said transistor in place of said impedance.

4. The method of measuring the beta parameter of a transistor according to claim 3, wherein a square wave voltage signal from said source is applied to the emitter and base electrodes of said transistor.

5. The method of measuring the beta parameter of a transistor having base, emitter and collector electrodes connected in circuit with other electrical components, said method comprising the steps of:

applying a voltage signal from a source having a negligible impedance compared to the impedances of said other electrical components, to the emitter and base electrodes of said transistor, connecting current measuring means to the collector and base of said transistor, said means having a small impedance compared to the impedances of said other electrical components, adjusting the amplitude of said voltage signal to produce a desired predetermined current between said collector and base, said current being smaller in magnitude than the collector-base saturation current for said transistor, and being provided in the absence to said transistor of a D.C. voltage component from a source external to the transistor applied for biasing purposes, replacing said current measuring means with a short circuit, inserting said current measuring means to measure the current through the base electrode of said transistor, and measuring said base current, whereby the beta parameter of the transistor may be indicated directly.

6. The method of measuring the beta parameter of a transistor according to claim 5, wherein a square wave voltage signal is applied to said base and emitter electrodes.

7. A circuit for measuring the beta parameter of a transistor having base, emitter and collector electrodes connected in circuit with other electrical components, said circuit operating said transistor class B in a common base configuration to provide rectified base and collector electrode currents for measuring beta and without the application to said transistor of a D.C. biasing voltage from a source external to said transistor to obtain said class B operation, and comprising in combination:

a signal means having first and second output leads providing an alternating voltage having fundamental and harmonic frequencies without a D.C. voltage component, said means having an adjustable voltage output to produce a rectified collector electrode current with a D.C. component having a peak value smaller than the collector-base saturation current for said transistor and a negligible D.C. output impedance compared to the D.C. impedances of said other electrical components, current measuring means having a low impedance compared to the impedance of said other electrical components and being responsive to D.C. current, and connecting means for applying said alternating voltage from the first and second output leads of said signal means, respectively, to the emitter and base electrodes of said transistor in the absence of the application to said transistor of a D.C. voltage component from a source external to the transistor, said connecting means connecting said current measuring means in circuit between said collector electrode and second lead of said signal means for responding to the direct current component of the rectified collector electrode current, and connecting said current measuring means in circuit between the base electrode and the second lead of said signal means for responding to the direct current component of the rectified base electrode current of said transistor for measuring beta, whereby said circuit measures the beta parameter of a transistor without applying a D.C. voltage component thereto from a source external to the transistor for biasing purposes and provides for the application of an alternating voltage adjustable to a value to keep the amplitude of the collector current below the level of the collector saturation current so that the necessary bias is provided by the transistor itself for class B operation.

8. A circuit for determining the beta parameter of a transistor according to claim 7, wherein said voltage source comprises a square wave alternating voltage source.

9. A circuit for measuring the beta parameter of a transistor having base, emitter and collector electrodes connected in circuit with other electrical components, said circuit operating said transistor class B in a common base configuration for providing rectified base and collector electrode currents for measuring beta, and comprising in combination:

a signal means having first and second output leads providing an alternating voltage having fundamental and harmonic frequencies, said means having an adjustable voltage output and a negligible D.C. output impedance compared to the D.C. impedances of said other electrical components, current measuring means having a low impedance compared to the impedance of said other electrical components and being responsive to D.C. current, and switching means for applying signals from the first and second leads of said signal means, respectively, to the emitter and base electrodes of said transistor and having first and second positions, said switching means when in its first position connecting said current measuring means in circuit between said collector electrode and said second lead of said signal means for responding to the direct current component of the rectified collector electrode current while when in its second position connecting said current measuring means in circuit between the base electrode and the second lead of said signal means for responding to the direct current component of the rectified base electrode current of said transistor, whereby said circuit measures the beta parameter of a transistor without applying a D.C. voltage component thereto from a source external to the transistor for biasing purposes and provides for the application of an alternating voltage adjustable to a value to keep the amplitude of the collector current below the level of the collector saturation current so that the necessary bias is provided by the transistor itself for class B operation.

10. A circuit for measuring the beta parameter of a transistor according to claim 9, wherein said current measuring means comprises an ammeter.

11. A circuit for measuring the beta parameter of a transistor according to claim 10, wherein there is additionally provided a capacitor permanently connected in parallel circuit relation with said ammeter.

12. A circuit for measuring the beta parameter of a transistor according to claim 11, wherein when said switch is in said first position there is a shunt resistor additionally provided, said resistor being connected in parallel with said ammeter to extend its full scale deflection current reading range.

References Cited by the Examiner
UNITED STATES PATENTS

| | | | |
|---|---|---|---|
| 2,847,645 | 8/1958 | Thomas | 324—158 |
| 2,897,448 | 7/1959 | Raisbeck | 324—158 |
| 2,922,954 | 1/1960 | Bigelow | 324—158 |
| 3,051,900 | 8/1962 | Zechter | 324—158 |
| 3,056,924 | 10/1962 | Thomas | 324—158 |

OTHER REFERENCES

Journal of Scientific Instruments, March 1958, vol. 35, page 115.

The C-D (Cornell-Dubelier) Capacitor, vol. 19, No. 5, May 1954, pp. 3–9.

WALTER L. CARLSON, *Primary Examiner.*

E. L. STOLARUN, *Assistant Examiner.*